US006613376B2

(12) United States Patent
Smith et al.

(10) Patent No.: US 6,613,376 B2
(45) Date of Patent: Sep. 2, 2003

(54) STORAGE STABLE PAN RELEASE COATING AND CLEANER

(75) Inventors: Robert M. Smith, Ballwin, MO (US); John P. Starr, Woodland Park, CO (US)

(73) Assignees: Par-Way Group, Inc., St. Clair, MO (US); Sunnycrest BNB, Inc., Delta, CO (US)

( * ) Notice: Subject to any disclaimer, the term of this patent is extended or adjusted under 35 U.S.C. 154(b) by 0 days.

(21) Appl. No.: 09/803,544

(22) Filed: Mar. 12, 2001

(65) Prior Publication Data

US 2002/0168464 A1 Nov. 14, 2002

(51) Int. Cl.$^7$ .................................................. A23D 9/04
(52) U.S. Cl. ..................... 426/609; 426/662; 426/811; 106/243; 106/244; 134/2; 134/3; 134/25.2; 134/40; 134/41; 510/197; 510/437; 510/476; 510/483; 510/491
(58) Field of Search ................................ 426/811, 609, 426/662; 106/243, 244; 134/25.2, 2, 3, 40, 41; 510/197, 491, 437, 476, 483

(56) References Cited

U.S. PATENT DOCUMENTS

| | | | | |
|---|---|---|---|---|
| 3,906,117 A | * | 9/1975 | Gawrilow | 426/420 |
| 3,928,065 A | * | 12/1975 | Savino | 134/2 |
| 4,056,113 A | * | 11/1977 | Johnson et al. | 134/39 |
| 4,073,411 A | * | 2/1978 | Doumani | 106/244 |
| 4,188,412 A | * | 2/1980 | Sejpal | 426/609 |
| 4,192,898 A | * | 3/1980 | Hanson, Sr. | 426/250 |
| 4,302,512 A | * | 11/1981 | Weitemeyer et al. | 427/387 |
| 4,339,465 A | * | 7/1982 | Strouss | 426/293 |
| 4,463,029 A | * | 7/1984 | Nishijima et al. | 229/406 |
| 4,479,977 A | * | 10/1984 | Dashiell et al. | |
| 4,547,388 A | * | 10/1985 | Strouss | |
| 5,102,573 A | * | 4/1992 | Han et al. | 134/19 |
| 5,137,793 A | * | 8/1992 | Cockrell, Jr. | 134/19 |
| 5,185,091 A | * | 2/1993 | Ogake et al. | 508/486 |
| 5,455,055 A | * | 10/1995 | Stoltz | 426/115 |
| 5,503,866 A | * | 4/1996 | Wilhelm, Jr. | 106/243 |
| 5,662,956 A | * | 9/1997 | Knightly | 426/601 |
| 5,858,941 A | * | 1/1999 | Oakes et al. | 134/40 |
| 6,268,324 B1 | * | 7/2001 | Besse et al. | 510/197 |

FOREIGN PATENT DOCUMENTS

| | | | |
|---|---|---|---|
| WO | WO91/05481 | * | 5/1991 |
| WO | WO94/22313 | * | 10/1994 |

OTHER PUBLICATIONS

Kippel, 1996. How to Clean Practically Anything, 4$^{th}$ edition. Consumer Reports Books, Yonkers, New York, p. 155.*

* cited by examiner

Primary Examiner—Carolyn Paden
(74) Attorney, Agent, or Firm—James A. Quinton, Esq.

(57) ABSTRACT

The pan release coating is provided which includes water, mono and diclycerides, polysorbate, and an antimicrobial effective amount of acetic acid, citric acid and sodium benzoate. Desirably, the composition of the present invention is composed of water in an amount of 77% to 95% by weight, acetic acid in the amount of 0.3 to 1% by weight, citric acid in the amount of 0.02 to 1.0% by weight, sodium benzoate in an amount of 0.02 to 0.3% by weight, monoglycerides and diglycerides in the amount of 2 to 8% by weight and polysorbate in the amount of 2 to 7% by weight. Desirably, lecithin is also included. The resulting product has a pH of 4.5 or below, desirably between about 3.5 and 4.5, and most desirably a pH of 3.6 to 3.9. The product has a shelf life of 12 months or longer at room temperature, without refrigeration or a sealed container.

10 Claims, No Drawings

STORAGE STABLE PAN RELEASE COATING AND CLEANER

BACKGROUND OF THE INVENTION

1. Field of the Invention

The subject invention relates to pan release coatings for use in cooking that can be stored for extended periods of time without refrigeration or a sealed container. The invention also relates to a pan coating that in use promotes the removal of carbon build-up in baking equipment and that can be used as a cooking surface cleaner.

2. Description of Prior Art

Pan release coatings have long been used in cooking. Pan release coating for products such as bread, rolls, pastries and the like are described in U.S. Pat. Nos. 4,547,388 and 4,339,465. These patents show liquid pan releases having a liquid emulsifier containing monoglycerides, diglycerides, polysorbate, citric acid and water. However, such products had a short shelf life of 30 to 90 days at room temperature. There is a need for improved pan release coatings for use in baking that have a long storage life.

Cooking surfaces can be difficult to clean. Often highly caustic compositions containing sodium hydroxide are used. There is a need for improved cooking surface cleaning compositions, that are nontoxic, nonflammable and easy to use.

SUMMARY OF THE INVENTION

The present invention relates to a storage stable pan release coating for use in cooking particularly in baking and to a pan release coating that can also be used as a cooking surface cleaner.

The pan release coating according to the invention includes water, mono and diclycerides, polysorbate, and an antimicrobial effective amount of acetic acid, citric acid and sodium benzoate. Desirably, the composition of the present invention is composed of water in an amount of 77% to 95% by weight, acetic acid in the amount of 0.3 to 1% by weight, citric acid in the amount of 0.02 to 1% by weight, sodium benzoate in an amount of 0.02 to 0.3% by weight, monoglycerides and diglycerides in the amount of 2 to 8% by weight and polysorbate in the amount of 2 to 7% by weight. Desirably, lecithin is also included. According to the invention, the resulting product has a pH of 4.5 or below, desirably between about 3.5 and 4.5, and most desirably a pH of 3.6 to 3.9. The product has a shelf life of 12 months or longer at room temperature, without refrigeration or a sealed container and without exhibiting any significant growth of microorganisms, that often spoil these types of products. The product is storage stable after the container has been opened without refrigeration.

According to the invention a thin layer of the product is applied to a cooking surface. Desirably, the product is sprayed on the cooking surface, particularly the surface of an oven or pan for use in a commercial baking facility. The result is a baked product that can be easily removed from the cooking surface. In addition, there is little or no build-up of gummy residue on the cooking surface. Pans and the like can often be cleaned with a damp cloth. When the pan coating according to the invention is used on an already carbonized cooking surface, the carbon is removed during use.

In another aspect of the invention, the composition can be used to clean barbecue grills and other broiling surfaces.

It is an object of the inventor to provide a pan release coating for use in cooking, having improved storage stability at room temperature.

It is an object of the inventor to provide a pan release coating for bakery products, having improved storage stability at room temperature.

It is an object of the inventor to provide an improved pan release coating for barbecue and broiling grills.

It is an object of the inventor to provide an improved barbecue and broiling grill cleaner.

It is an object of the invention to provide a pan release coating which in use will remove the carbon build-up on baking pans, ovens and other cooking surfaces.

Other and further objects will become apparent from the appended specification drawing and claims. It should be understood that there are numerous embodiments contemplated by the subject invention. Every embodiment of the invention does not necessarily achieve every object of the invention.

The preferred embodiment of the present invention is illustrated in the drawings and examples. However, it should be expressly understood that the present invention should not be limited solely to the illustrative embodiment.

DETAILED DESCRIPTION

The present invention relates to a storage stable pan release coating for use in cooking, particularly in baking, and to a pan release coating that can also be used as a cooking surface cleaner. The pan release coating is particularly desirably for use in bakery products such as bread, bagels, waffles and fruit pastries.

Pan release agents are products used to facilitate the removal of baked goods from baking pans or hearth oven surfaces. They are typically sprayed, under pressure, onto the baking surfaces. When repeatedly used in the typical baking process, these release agents have a tendency to build up on the baking surfaces (pans or hearth ovens, for example). Further, the high heats used in the baking process have a tendency to cause the organic compounds in the release agents to degrade. These degradation compounds and the normal components of baked goods (oils, flour, sugar, etc.) plus newly added release agents can then combine to produce a medium to dark coating on the baking surfaces.

Over time, these coatings reduce the effectiveness of the pan release agent and result in the need to chemically or mechanically clean the buildup off the baking surface. In addition, in glazing baking pans, these degradation compounds also can destroy the glaze coating, ultimately necessitating an expensive re-glazing of the baking pan. Further, these compounds can build up on oven working parts and increase the risk of fires in the oven itself.

The present invention relates to a water based pan release agent which, when applied, not only does not build up on baking surfaces, but will also aggressively, but safely, remove accumulated buildup from baking surfaces and keep it from coming back. When the subject invention is used, the baking surface can be returned to a "like new" condition. In the case of hearth type ovens (with either plate or woven mesh screen baking surfaces), this means that expensive mechanical or chemical cleaning can be eliminated. In the case of glazed baking pans, this means that the degradation products which reduce glaze life are minimized or eliminated, greatly increasing glaze life. The lack of buildup also greatly reduces fire danger in the baking environment.

The pan release coating according to the invention includes water, mono and diglycerides, polysorbate, and an antimicrobial effective amount of acetic acid, citric acid and sodium benzoate. Optionally, lecithin can be included in the composition. Desirably, the composition of the present invention is composed of water in an amount of 77% to 95% by weight, acetic acid in an amount of 0.3 to 1% by weight, citric acid in an amount of 0.02 to 1.0% by weight, preferably 0.1 to 0.3% by weight, sodium benzoate in an amount of 0.02 to 0.3% by weight, preferably 0.2 to 0.1% by weight, monoglycerides and diglycerides in an amount of 2 to 8% by weight and polysorbate in an amount of 2 to 7% by weight. The polysorbate component is preferably derived from the reaction of the ethylene oxide and the sorbitan ester of the stearic acid, e.g., polyoxyyethylene (20) sorbitan monostearate. This particular polysorbate is commercially known as polysorbate 60. Desirably, lecithin is also included in an amount of 1 to 8% desirably 4% or greater more desirably 4 to 7% by weight. According to the invention, the resulting product has a pH below 4.5, desirably between about 3.5 and 4.5, and most desirably a pH of 3.6 to 3.9. Optionally, potassium sorbate is added. An antioxidant, for example, propyl gallate, TBHQ, BHT or BHA are added. Organic or silicone antifoaming agents are desirably included in the composition to reduce foam. For example, dimethyl polysiloxane in an amount of about 2 to 70 ppm or organic antifoaming agent for example HODAG FG2101K supplied by Lambert Technologies, Skokie, Ill., in an amount of about 2 to 10 ppm. The resulting product is storage stable at room temperature for 12 months or longer without refrigeration or a sealed container.

According to the invention, the product is applied to a cooking surface, preferably a surface that will be used in baking bakery products such as breads, fruit pastries, bagels, waffles and the like. In use, a thin film of the product is applied either by spraying or brushing on a cooking surface, preferable spraying on a baking surface. The pan release coating is applied in a thin layer that lightly coats the surface. Optionally, the pan coating is applied to a broiling or grilling surface such as used in broiling or barbecuing. Desirably, the product is sprayed on the cooking surface, particularly the surface of an oven or pan for use in a commercial baking facility. The result is a baked product that can be easily removed from the cooking surface. In addition, there is little or no build-up of gummy residue on the cooking surface. Pans and the like can often be cleaned with a damp cloth. When the pan coating according to the invention is used in an already carbonized cooking surface, the carbon is removed during use. Where the device (e.g., waffle iron or bread pan) is heavily carbonized, it may take several uses before it is fully cleaned.

The cleaning effect of the product of this invention is also desirable in normal baking operations. The use of the composition according to the invention will eliminate buildup of excess oils and/or decomposition products on oven walls, plates, demisters and other oven equipment. By eliminating this buildup, the risk of oven fires is greatly reduced and safety of the baking operation is improved. The product of the invention, in fact, has a very aggressive cleaning property when applied to a baking surface. This cleaning property is much greater than what is experienced if either citric acid, acetic acid or a combination of both were used alone as a cleaner on the hearth oven or the baking pans. When these cleaners are added straight to the oven, very little cleaning effect is noted. On a warm or hot baking surface, in particular, these products just evaporate immediately, never even having a chance to produce any cleaning effect.

In the present invention, however, the acids are dispersed in the active ingredients of the product. As with the straight additions of the dilute citric or acetic acid cleaning solutions, the water carrier of the pan release coating of the present invention evaporates when it hits the warm or hot baking surface. The active ingredients of the invention (glycerides, sorbitan esters and lecithin) do not evaporate however, but remain on the oven surface in a thin layer. Since the citric and acetic acids are dispersed in the active ingredients during the manufacturing process, they are carried to the surface of the oven in the active layer and can work on any buildup that may be present. By balancing and controlling the product pH, the cleaning effect can be achieved without making the product so aggressive that it corrodes or rusts production equipment, making it safe to use in most bakery applications.

In another aspect of the invention, the pan release coating according to the invention can be used as a non-toxic grill cleaner. Desirably, the grill is heated up for several minutes. The composition is then sprayed or brushed on and left to set for one to two minutes. The grill can then be wiped clean with a rag.

Desirably, the composition of the invention, is made in two steps. First a premix is formed. Desirably, the premix consists of three (3) main ingredients; mono and diglycerides (in varying forms), lecithin and sorbitan esters of stearates (polysorbates). Under normal conditions, lecithin and the glycerides are not soluble or dispersible in water. Sorbitan esters of stearates, on the other hand, are quite soluble or dispersible in water.

In the premix, the ingredients are mixed in a high speed, high shear mixer in the relative ratios desired in the final pan release composition. Mixing time is dependent on the equipment and the composition. The components should be mixed until the sorbate is finely dispersed with the lecithin and glycerides. Mixing time of at least six (6) minutes or more is preferable. (Note: the size of the mixing vessel, size and type of the high shear mixing head and the horsepower of the mixing motor must be balanced according to normal mixing engineering calculations) The high shear mixing causes the polysorbate to become finely and thoroughly dispersed into the lecithin and glycerides. This mixing can be done either under vacuum or at room conditions, desirably, at a temperature of 65° F. or above. If the mixing is not done under vacuum, air can be entrained in the premix. This can result in the production of varying amounts of foam in the premix. Preferably, the foam is minimized through the addition of a suitable defoamer during the mixing phase. Percentages in the premix can vary from 0–50% lecithin, 33–67% glycerides, and 16–33% polysorbates depending upon the desired final composition of the release agent.

The premix phase aids in the production of a long term stable pan release coating. Integrally mixing the soluble sorbitan esters with the insoluble components under the high shear conditions actually results in the admixture of all three (3) components becoming both dispersible and soluble in water. Desirably, the premix should be aged, preferably for about 12 hours or longer preferably about 24 hours or longer, prior to use in formulating the pan release coating to avoid separation of the product either immediately after manufacture or several weeks or months after manufacture. After the premix has been produced and has been allowed to age, the premix is combined with water, citric acid, acetic acid and sodium benzoate. In this step, water and aged premix are introduced preferably simultaneously into another high speed, high shear mixing vessel under agitation. The size of the mixing vessel, size and type of the mixing head and horsepower of the mixing motor should be balanced according to normal engineering calculations. Premix/water ratios for a stable, long shelf life release agent can vary between 1/20 and 1/4. Desirably, premix/water ratios between 1/5 and 1/6 are used. After the premix and water have been added, the organic acids and benzoate are also added to the water and premix. Preferably, the acids and benzoate are added slowly under agitation in this phase.

The components are mixed under high speed, high shear conditions for a sufficient time for all components to be properly dispersed or solubulized without the formation of excessive foam during the mixing operation. Typically, a mixing time of 2 to 4 minutes has been found to be desirable, but the time can vary depending on the equipment used and the particular composition of the pan release coating. Different times may be used depending on the equipment and mixing speed and shear and composition. The resulting product is storage stable at room temperature for 12 months or longer.

EXAMPLE 1

A pan release coating and a non-toxic cooking surface cleaner was prepared according to the invention. A premix was prepared containing the polysorbate 60, lecithin and mono and diglycerides. The premix contains 49.4% mono and diglycerides, 24.6% polysorbate 60 and 26% lecithin. The components were charged into a high speed, high sheer mixer along with about 3 ppm of dimethy polysiloxane antifoaming agent. The high sheer mixer was operated for 6 minutes to finely disperse the polysorbate with the lecithin and glycerides. The dispersed components were then aged overnight. The aged premix and water were then simultaneously charged into a high sheer mixer under agitation. The citric acid, acetic acid and sodium benzoate were then added slowly under agitation. A water premix ratio of about 5.5 to 1 is used. The components were then mixed for 2 to 4 minutes to form a dispersion without excessive foam. The resulting pan release coating has a composition as follows:

| Water | 83.85% |
|---|---|
| Mono and Diglcerides | 7.6 |
| Polysorbate 60 | 3.8 |
| Lecithin | 4.0 |
| Acetic Acid | 0.6 |
| Sodium Benzoate | 0.1 |
| Citric Acid | 0.05 |

EXAMPLE 2

A pan release coating is prepared as described in Example 1. A premix is formed having a ratio of mono and diglcerides, polysorbate and lecithin equal to that desired in the final composition. The resulting final product has a composition as follows:

| Water | 84.55% |
|---|---|
| Mono and Diglcerides | 4.9 |
| Polysorbate 60 | 2.5 |
| Lecithin | 7.3 |
| Acetic Acid | 0.6 |
| Sodium Benzoate | 0.1 |
| Citric Acid | 0.05 |

EXAMPLE 3

The composition of Example 1 was applied to a hearth oven which had not been cleaned for over eight (8) months. This oven had almost 1/16 of an inch of a very hard buildup of degradation products on the oven surface. This buildup could not be removed by simple scraping, only by grinding with a mechanical grinder.

One oven revolution after the application of the invention was started, it was noticed that the top layer of the buildup (about 1/128 of an inch) was starting to soften. As the oven continued to cycle, the depth of the softening continued. After two cycles, hand scrapers were used to begin to successfully remove the buildup. After about eight cycles, nearly all the buildup had been removed by the combination of the application of the invention and the hand scrapers. Over the next few weeks, application of the invention was continued and the buildup did not return.

EXAMPLE 4

The pan release coating in Example 1 was used on an oven where there was only minimal buildup. In this case, the buildup was light enough that it was felt that scraping of the oven was not necessary. After use of the invention, the minimal buildup began to be removed from the oven. In this case, the buildup softened and was transferred to the bottom of the product being baked.

EXAMPLE 5

The composition of Example 1 was sprayed into a baking pan which had been used only about 20 cycles before application of the invention was started. This pan had only a small amount of buildup. This was removed in about three cycles.

EXAMPLE 6

The composition of Example 1 was applied to a woven mesh band oven in a pocket sandwich baking operation. The woven mesh had significant carbonization products buildup on and between the woven mesh surfaces. The invention successfully removed the buildup on this oven in less than 24 hours.

EXAMPLE 7

The composition of Example 1 was used on new, recently glazed bun pans. These pans were used in a high volume bakery. This bakery did not use any release agent. Rather, they frequently glazed their pans to effect the desired product release. At the production rate, the pans were used many cycles each day. The typical experience was about one month's use before the glaze has deteriorated to the point where the release was no longer acceptable. After use of the invention was started, operating conditions improved to the point where the time between glazings had been doubled.

EXAMPLE 8

A waffle iron that has been sprayed with a typical oil based release agent for a number of waffle cycles had a dark brown buildup (from decomposition products) on the surface of the waffle iron. The product of Example 1 of the invention is sprayed on this "aged" iron. Over the course of 3–5 waffle cycles, all or nearly all of the brown buildup from the waffle was removed and the waffle iron was returned to "like new" condition. The product of the invention can then be used for hundreds of cycles without the brown buildup returning.

EXAMPLE 9

A barbecue grill that had encrusted and carbonized food deposits was cleaned with the composition of Example 1. The grill was heated up. The composition of Example 1 was sprayed and allowed to sit for about 1 minute and then wiped off with a rag. The result was a clean grill surface, free of encrusted food and carbonized buildup. The product did not flame up or burn as does oil based products.

The present invention has been described in detail with regard to the exemplary embodiments thereof it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

Also, several different embodiments of the present invention are described above with each such embodiment as described as including certain features. However, it is intended that the features described in connection with the discussion of any single embodiment are not limited to that embodiment but may be included and/or arranged in various combinations in any of the embodiments as well, as will be understood by those skilled in the art.

What is claimed is:

1. A method of making a pan release coating and cooking surface cleaner composition comprising;

charging mono and dyglycerides, polysorbate and lecithin into a first high shear mixer having a relative ratio to one another that is desired in said composition;

adding a defoaming agent;

operating said high sheer mixer until said polysorbate is finely dispersed with said lecithin and mono and diylycerides to form a premix;

aging said premix for at least 12 hours;

simultaneous charging said aged premix and water in a ratio of from about 1:20 to about 1:4 in a high sheer mixer under agitation;

adding sodium benzoate, citric acid and acetic acid to the agitating premix and water to form said pan release coating and cooking surface cleaning composition.

2. The method of claim 1 wherein said formed pan release coating and cooking surface cleaning composition is composed of;
a) water;
b) mono and diglycerides;
c) polysorbate;
d) an antimicrobial effective amount of citric acid;
e) an antimicrobial effective amount of acetic acid;
f) an antimicrobial effective amount of sodium benzoate;
g) lecithin.

3. The method of claim 2 wherein said formed pan release coating and cooking surface cleaning composition is composed of;
a) about 77% to 95% water by weight;
b) about 2% to 8% monoglycerides and diglycerides by weight;
c) about 2% to 7% polysorbate by weight;
d) about 0.02% to 1% citric acid by weight;
e) about 0.3% to 1% acetic acid by weight;
f) about 0.02 to 0.1% sodium benzoate by weight;
g) lecithin in an amount of about 4% to 7% by weight.

4. The method of any one of claims 1, 2 or 3 wherein said premix is aged for 24 hours or more.

5. The method of claim 3 wherein said citric acid is from 0.1 to 0.3% by weight.

6. A method of cleaning a barbecue grill comprising heating said grill, applying a pan coating comprising
a) about 77% to 95% water by weight;
b) about 2% to 8% monoglycerides and diglycerides by weight;
c) about 2% to 7% polysorbate by weight;
d) about 0.02% to 1% citric acid by weight;
e) about 0.3% to 1% acetic acid by weight;
f) about 0.02 to 0.3% sodium benzoate by weight;
g) lecithin;

allowing said pan coating to set; and wiping said grill clean.

7. The method according to claim 6 wherein said pan coating is allowed to set for 1 to 3 minutes.

8. The method of cleaning a barbecue grill according to claim 6 wherein said lecithin is an amount of above about 4%.

9. The method of cleaning a barbecue grill according to claim 6 wherein said lecithin is in an amount of about 4 to 7%.

10. The method of cleaning a barbecue grill according to claim 6 further comprising antifoaming agent.

* * * * *